United States Patent
Schneider et al.

(10) Patent No.: US 6,625,116 B1
(45) Date of Patent: Sep. 23, 2003

(54) SYSTEM, METHODS AND APPARATUS FOR INCREASING THE DATA RATE ON AN EXISTING REPEATERED TELECOMMUNICATION CHANNEL STRUCTURE

(75) Inventors: Kevin W. Schneider, Huntsville, AL (US); Fred T. Y. Chu, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/306,919

(22) Filed: May 7, 1999

(51) Int. Cl.[7] .............................. H04B 3/36; H04B 3/46
(52) U.S. Cl. ...................... 370/226; 370/293; 370/465; 375/211; 375/219; 725/118; 725/148
(58) Field of Search ................................. 370/225, 226, 370/227, 276, 293, 465, 501, 502, 522; 375/211, 219, 220, 257; 725/105, 118, 126, 127, 143, 148, 149

(56) References Cited

U.S. PATENT DOCUMENTS

| | | | | |
|---|---|---|---|---|
| 4,187,415 A | * | 2/1980 | Boutmy et al. | 179/175.3 F |
| 4,334,303 A | * | 6/1982 | Bertin et al. | 370/13 |
| 4,347,607 A | * | 8/1982 | Nixon et al. | 370/110.1 |
| 4,451,916 A | * | 5/1984 | Casper et al. | 370/13 |
| 5,010,544 A | * | 4/1991 | Chang et al. | 370/13.1 |
| 5,809,033 A | | 9/1998 | Turner et al. | 370/522 |
| 5,999,542 A | * | 12/1999 | Turner et al. | 370/497 |

OTHER PUBLICATIONS

"Subscriber Loop Signaling and Transmission Handbook Digital", Whitham D. Reeve, IEEE Telecommunications Handbook Series, The Institute of Electrical and Electronics Engineers, Inc., New York, title page and pp. 6–7.

"Engineering of T1 Carrier System Repeatered Lines", H. Cravis and T.V. Crater, The Bell System Technical Journal, Mar. 1963, pp. 432–486.

"A 6.3 Mb/s Digital Repeatered Line", J. H. Davis, Bell Telephone Laboratories, Inc., Holmdel, New Jersey, pp. 34–9–34–16.

"T2 Digital Line System Design", R.B. Moore, Bell Telephone Laboratories, Inc., Holmdel, New Jersey, IEEE International Conference on Communications, Jun. 11–13, 1973, Seattle, WA, pp. 22–1–22–3.

"T2 Repeater and Equalization—Design and Performance", J.R. Davis, Bell Telephone Laboratories, Incorporated, Holmdel, New Jersey 07733, IEEE International Conference on Communication, Jun. 11–13, 1973, Seattle, WA, pp. 22–11–22–13.

"Committee T1—Telecommunications", Mr. Rude, Costa Mesa, California, Mar. 8–12, 1999, pp. 1–61.

* cited by examiner

*Primary Examiner*—Alpus H. Hsu
(74) *Attorney, Agent, or Firm*—Thomas, Kayden, Horstemeyer, & Risley, L.L.P.

(57) ABSTRACT

A system, method, and apparatus for increasing the data rate on an existing repeatered telecommunication channel structure. In illustrative embodiments, replacement transceivers and replacement repeaters provide for transferring data streams via the existing channel structure at a rate substantially greater than the data transfer rate of the existing channel structure. The replacement transceivers and replacement repeaters are spectrally compatible with existing services and provide data transfer performance equal to or better than the performance of the existing channel structure.

30 Claims, 11 Drawing Sheets

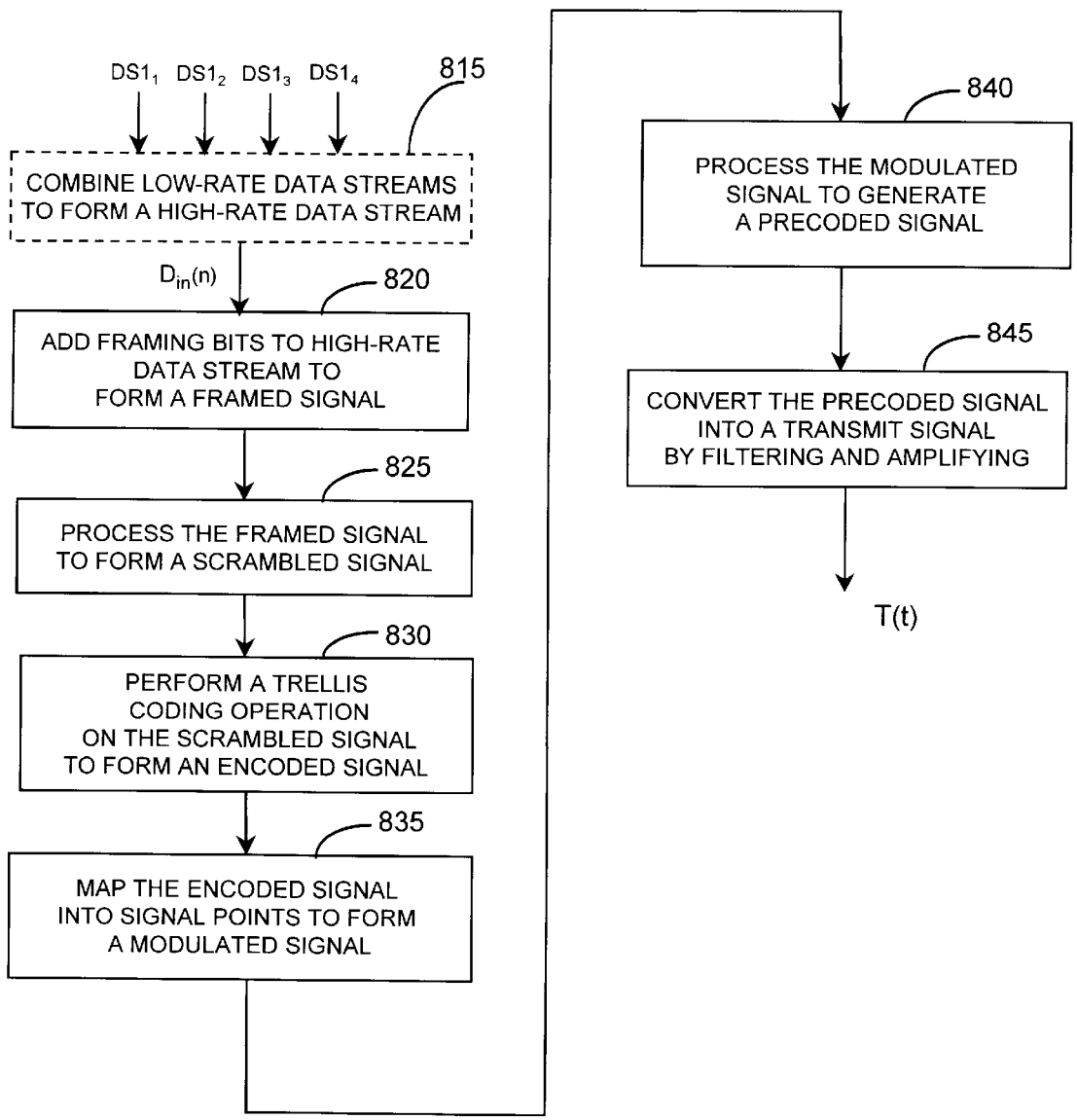

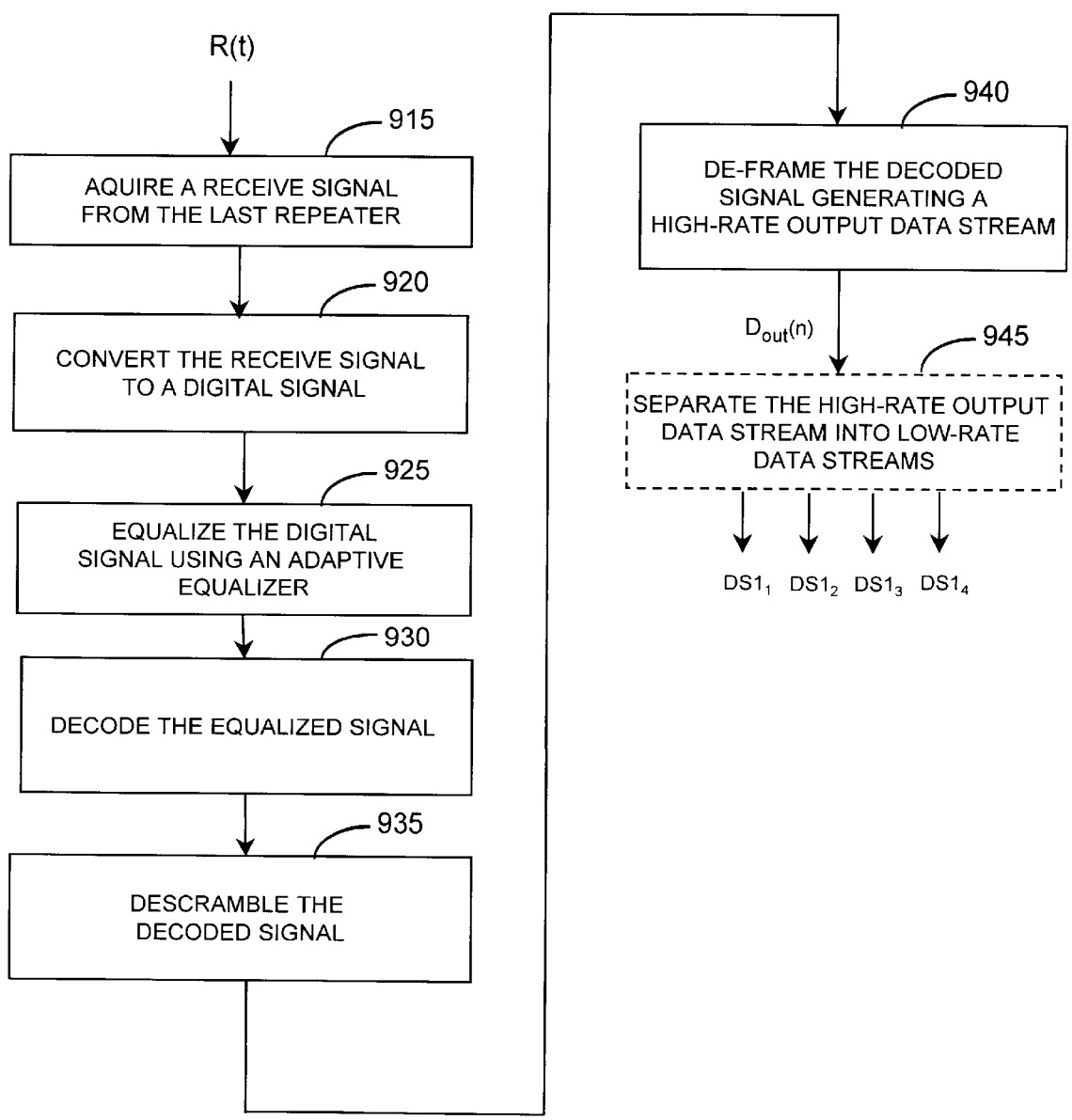

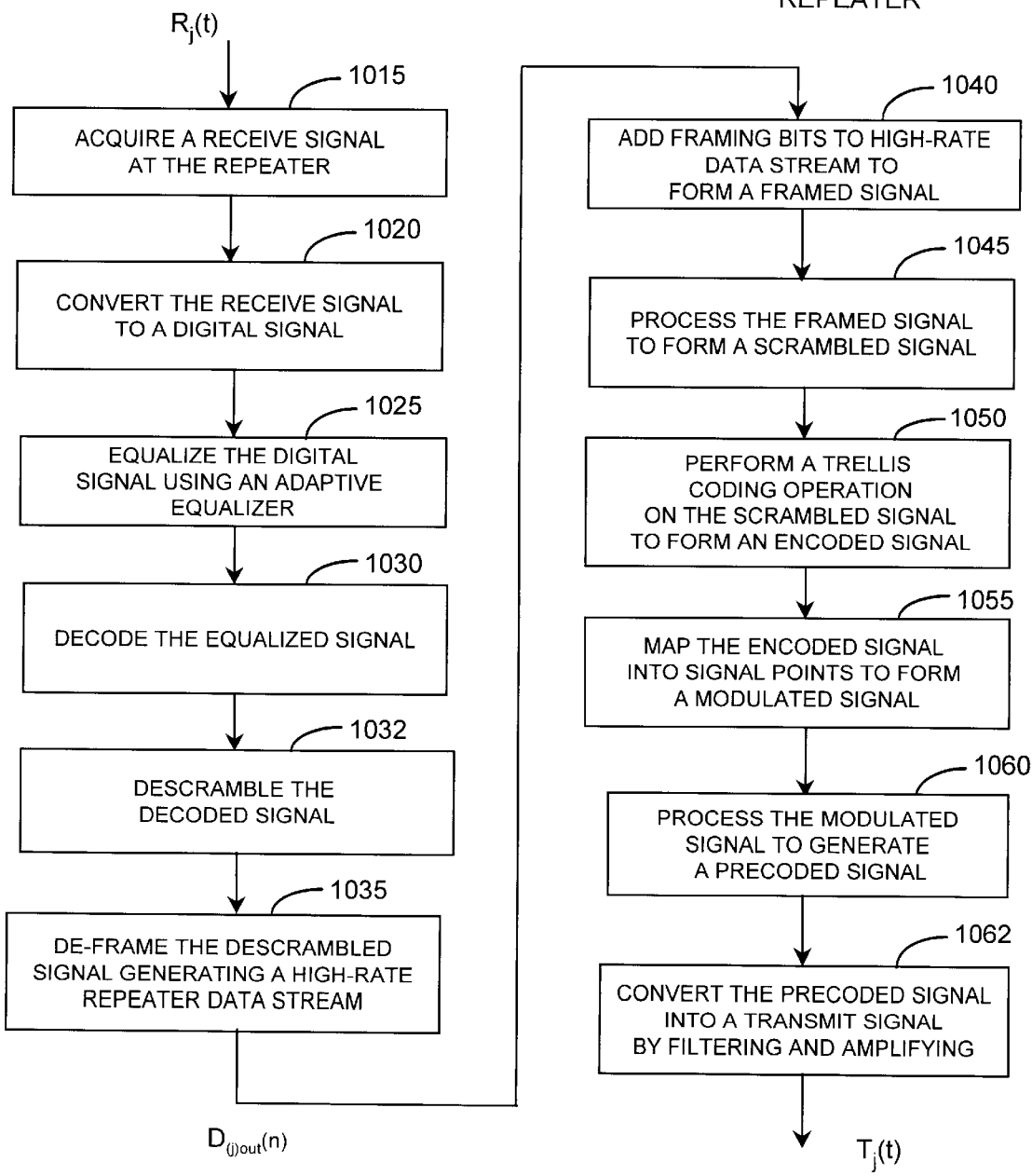

1100

SYSTEM, METHODS AND APPARATUS FOR INCREASING THE DATA RATE ON AN EXISTING REPEATERED TELECOMMUNICATION CHANNEL STRUCTURE

FIELD OF THE INVENTION

This application relates to information transmission systems and, more specifically, to a system, method and apparatus for increasing the data rate on an existing repeatered telecommunication channel structure. An existing repeatered telecommunication channel structure which had been designed to operate at a specified data rate, transfers data at rates up to four times or more than the specified rate, after incorporating improved transceiver and repeater elements constructed and arranged in accordance with the invention into the system. The major benefits of having an increased data rate on an existing channel structure include a cost effective means for delivering new data services to customers on existing channel structures.

BACKGROUND OF THE INVENTION

The use of telecommunication channel structures for high speed digital transmission of speech and data is essential for conducting everyday personal, business and governmental activities. As a result, costly high speed data services, such as the Integrated Services Digital Network (ISDN), have been developed to supplant conventional modems operating at substantially lower speeds than ISDN can provide. In addition, currently developing xDSL technologies will enable service providers to deliver digital service to customer sites at rates in excess of one megabit per second. Because of the increased demand for higher data rates at customer sites, there is a need to increase the data carrying capacity of service providers' existing networks.

Several methods are being used and developed for increasing the data carrying capacity of service providers' existing networks. For example, the use of fiber optics has increased significantly over the last 5 to 10 years. Further, HDSL2 technology (as described in a proposed draft ANSI standard T1E1.4/99-006R1) will enable the doubling of data rates over certain kinds of twisted-wire pairs. However, because of the cost and technical limitations associated with these and other extant methods for providing increased data carrying capacity, there remains a demand for increasing data rates on existing channel structures comprising cable bundles of twisted-wire pairs, optical fibers or coaxial cables, or the radio links of microwave systems.

The conventional repeatered T1-carrier system transfers data at the DS1 rate (1.544 Mbps) via a channel structure comprising cable bundles or sections of twisted-wire pairs connected between a first location, e.g., a central office, and a second location, e.g., a customer site. The cable sections of twisted-wire pairs are intended to interconnect a serial arrangement of repeaters, mounted in repeater equipment racks, between transceivers mounted in transceiver racks at the first and second locations. Typically, the transceiver racks and the repeater racks contain unpopulated printed circuit board or card slots reserved for the future installation of conventional DS1 rate T1-carrier transceivers and repeaters as required. In a typical T1-carrier installation, preselected twisted-wire pairs in the cable sections are reserved for connection in the future to such subsequently installed DS1 rate transceivers and repeaters.

The twisted-wire pair sections can include several gauges of wire, such as 19 AWG (American Wire Gauge), 22 AWG, 24 AWG, and 26 AWG. Each cable section typically has 25 or more twisted-wire pairs, preselected ones of which are reserved as spares or for connection to DS1 rate transceivers and repeaters installed in the future. A conventional repeatered T1-carrier system has a bit error ratio (BER) rate better than 1.0E-6 and preferably better than 1.0E-7. The design rules for a repeatered T1-carrier system are well known in the information transmission system art. See, for example, *Engineering of T1 Carrier System Repeatered Lines*, by H. Cravis and T. V. Crater, Bell System Technical Journal, March 1963, 431–486 and *Subscriber Loop Signaling and Transmission Handbook, Digital*, by Whitham D. Reeve, IEEE Press, 1995 ("Reeve").

When the repeatered T1-carrier system was designed, however, it was generally accepted that technology limited the rate for digital transmission over the required distances and conditions of the T-1 carrier channel structure to the DS1 rate. If transmission was required at a higher data rate, for example DS2 (6.312 Mbps), it was generally known and accepted that a channel structure different from the T-1 carrier channel structure was required; see for example Table 1-1 of the above-cited text by Reeve and the T2-carrier publications identified in the IDS submitted with this application. The existing channel structure for repeatered T-1 carrier currently supports only the DS1 rate.

Because new data transfer applications demand an increase in data bandwidth over a limited number of twisted-wire pairs, it is desirable for a service provider having the channel structure of a repeatered T1-carrier system to increase the data rate over that channel structure. However, any changes made to the repeatered T1-carrier system to provide an increased data rate must not cause unacceptable degradation of any existing services or an unacceptable amount of crosstalk coupled to neighboring twisted-wire pairs providing the same or other services. Any modification of an existing T1-carrier system to increase the data rate over the T1-carrier channel structure must be easy to implement, must provide equal or improved performance compared to the existing system, and must provide all the operation and maintenance features and safeguards required by the service provider.

A need exists to increase the data rates over existing telecommunication channel structures, such as the repeatered T1-carrier channel structure. The system for increasing the data rate must be cost effective and compatible with existing services.

SUMMARY OF THE INVENTION

It is therefore a principal object of the present invention to provide the capability of substantially increasing the data transfer rate over an established or existing channel structure above and beyond the established data transfer rate of the established channel structure, without modification of the channel structure.

The principal object is achieved by equipping the channel structure with one or more transceivers and one or more repeaters that are operational at the substantially increased data transfer rate, without modification of the established channel structure.

In one aspect of the present invention, the principal object is achieved by equipping unpopulated equipment rack slots, which have been reserved for future installation of transceivers and repeaters operational at the established data transfer rate, with transceivers and repeaters operational at the substantially increased data transfer rate.

In another aspect of the present invention, the principal object is achieved by the one-for-one replacement of extant transceivers and repeaters with transceivers and repeaters operational at the substantially increased data transfer rate.

In yet another aspect of the present invention, the principal object is achieved by both equipping unpopulated equipment rack slots, which have been reserved for future installation of transceivers and repeaters operational at the established data transfer rate, with transceivers and repeaters operational at the substantially increased data transfer rate, and also by the one-for-one replacement of extant transceivers and repeaters with transceivers and repeaters operational at the substantially increased data transfer rate.

Still another object of the present invention to provide a telecommunication system that substantially overcomes the data transfer rate limitations imposed on conventional repeated T1-carrier systems using existing T1-carrier channel structure.

It is a further object of the present invention to increase the data transfer rate in a conventional repeated T1-carrier system by a substantial amount, e.g., by a factor of two or more, to assist a service provider to satisfy customer demand for new data services on existing repeated T1-carrier channel structures.

Yet another object of the present invention is to incorporate new coding and modulation procedures into existing repeated T1-carrier systems by designing replacement transceivers and repeaters, which embody the new procedures and are capable of providing data transfer rates substantially higher than the DS1 rate used on existing T1-carrier channel structure.

Still another object of the present invention is to provide improved digital transmission over an existing repeated T1-channel structure by using components constructed in accord with the invention that are spectrally compatible with the existing system and do not interfere with or cause degradation of existing services.

A further object of the present invention is to provide a remote means for testing each component of the system constructed in accordance with the invention, in order to satisfy the operating and maintenance requirements of the service provider.

In accordance with our invention, we provide a method for increasing the rate of digital transmission over the repeated channel structure of an existing telecommunication system having at least one transceiver connected at each end of the structure and at least one repeater incorporated into the structure, wherein the system was initially designed to transmit data at a first data rate. The method includes the step of equipping the system with transceivers that are operational at a data transfer rate, substantially higher than the established data transfer rate for the system, and that are spectrally compatible with the existing transceivers. The method further includes the step of equipping the system with one or more repeaters that are operational at the substantially higher data transfer rate and that are spectrally compatible with the existing repeaters.

To generate the required signal at the higher data rate, we provide a method which further includes the step of transmitting a transmit signal from the higher transfer rate transceiver at one end of the channel structure in response to an input data stream having the higher transfer rate; the step of regenerating the transmit signal at each of the higher transfer rate repeaters; the step of acquiring a signal representative of the transmit signal at the higher transfer rate transceiver located at the other end of the channel structure; and the step of generating from the acquired signal an output data stream having the higher transfer rate and being a time delayed version of the input data stream.

BRIEF DESCRIPTION OF THE DRAWINGS

In the accompanying drawings, like reference numerals indicate like features and:

FIG. 8 is a flow chart illustrating a method for generating a transmit signal in accordance with the present invention;

FIG. 9 is a flow chart illustrating a method for receiving a channel impaired regenerated transmit signal ("receive signal") in accordance with the present invention;

FIG. 10 is a flow chart illustrating a method for regenerating a transmit signal in accordance with the present invention.

DETAILED DESCRIPTION OF THE PREFERRED EMBODIMENTS

Figure 1:
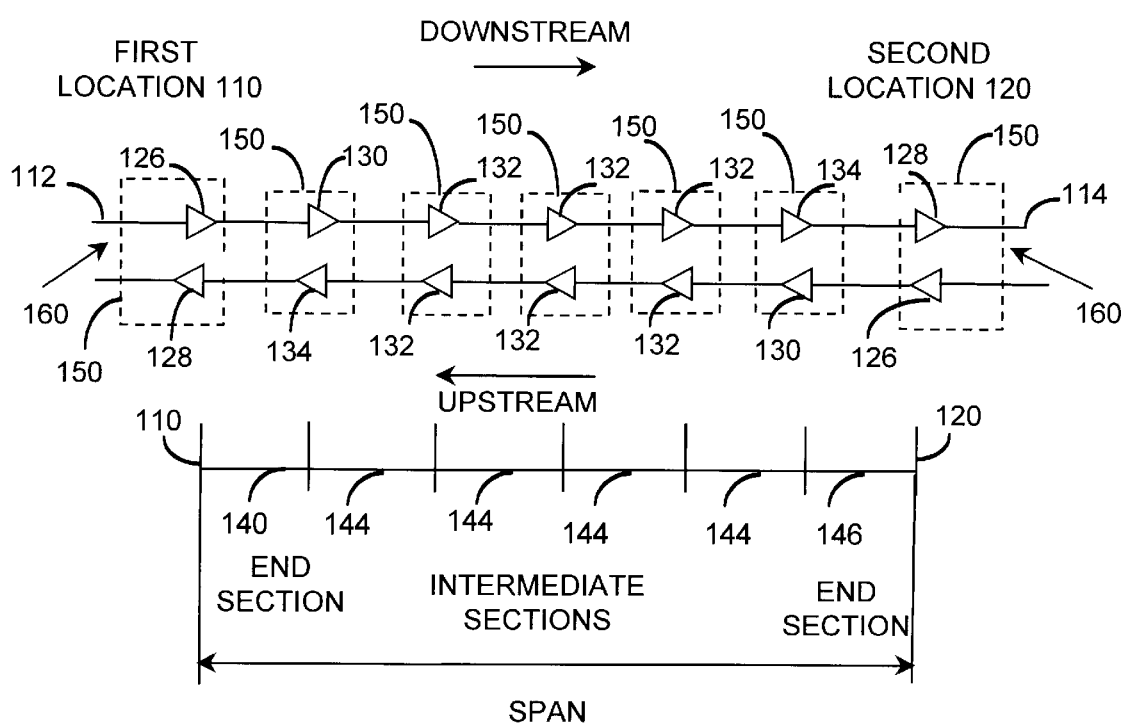
FIG. 1 is a block diagram of a conventional repeated T1-carrier system.

Referring to FIG. 1, a conventional repeated T1-carrier system 100 digitally transfers data via a channel structure comprising twisted-wire pair cable bundles or sections 140, 144, 146 from a first location 110, e.g., a central office, to a second location 120, e.g., a remote terminal at a customer site. Data transferred from the first location 110 to the second location 120 are called "downstream data"; data transferred in the opposite direction are called "upstream data".

In the conventional repeated T1-carrier system, a transceiver 160 comprising a transmitter section 126 and a receiver section 128 is mounted on a plug-in board 150. Transmitter 126 generates an output signal ("transmit signal") in response to an input data stream 112 using an alternate mark inversion (AMI) line code. The transmit signal travels on an assigned twisted-wire pair in a cable section 140 ("first end section") and arrives as a channel impaired signal at a first downstream T1-repeater 130. Downstream repeater 130 and upstream repeater 134 are mounted on a plug-in board 150.

The first T1-repeater 130 includes a receiver section for regenerating the input data stream 112 from the channel impaired signal in tandem with a transmitter section for regenerating the transmit signal from the regenerated input data stream ("repeater data stream"). The term "regenerating" is understood in the art to refer to all of the functions performed by a conventional T1-repeater, e.g., signal detecting, converting, demodulating, and modulating, which are required to recreate the original input data stream and transmit signal at each repeater.

The output of the first T1-repeater 130 travels on an assigned twisted-wire pair in intermediate cable sections 144 connected between a plurality of intermediate downstream repeaters 132 to the terminating downstream repeater 134. The regenerating process occurs at each intermediate downstream repeater 132 and at the terminating downstream repeater 134. The output of repeater 134 travels on an assigned twisted-wire pair in a cable section 146 ("second end section") to the receiver section 128 of a transceiver 160 mounted on a plug-in board 150 at the second location 120. Transceiver 160 can be part of a channel service and data service unit (CSU/DSU) at the second location 120.

The receiver 128 at the second location 120 converts the channel impaired signal ("receive signal") from the last repeater 134 into an output data stream 114 that represents a time delayed version of the input data stream 112, assuming error-free transmission.

Conventional T1-carrier systems are designed to have an bit error ratio (BER) of 1.0E-6 or better. Although conventional T1-transceivers and repeaters may introduce impairments, the principal impairments affecting BER are caused by the twisted-wire pair cable sections connecting the transceivers and repeaters.

As illustrated in FIG. 1, the upstream leg of conventional repeatered T1-carrier is configured similarly to the downstream leg.

The structural details of conventional repeatered T1-carrier systems, the loss characteristics of the twisted-wire pair channel structure thereof, the effects of crosstalk, and other factors in the design of the T1-carrier system are well-known in the art. In a conventional repeatered T1-carrier systems, the length of an end section 140, 146 is typically about 3,000 ft and the length of an intermediate section 144 is typically about 6,000 ft. The actual length of any section is dependent on the gauge of the wire, the proximity of other cable pairs, and other factors well-known in the art that limit digital transmission rates over existing T1-carrier channel structure. Conventional transceivers used in repeated T1-carrier systems further limited the maximum rate of transmission to DS1 rate. See H. Cravis and T. V. Crater, op. cit.

Figure 2:
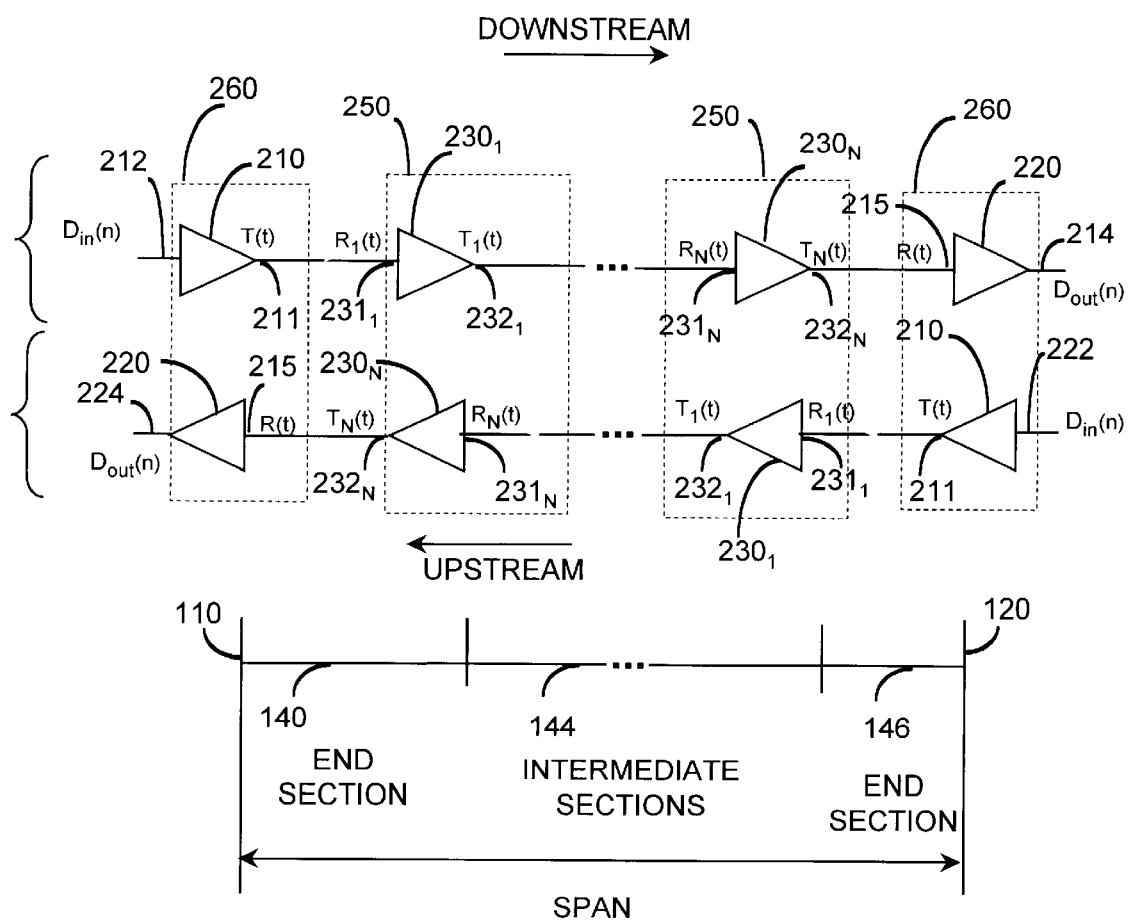
FIG. 2 is a block diagram of the T1-carrier system of FIG. 1 modified in accordance with an illustrative embodiment of the present invention.
Figure 7:
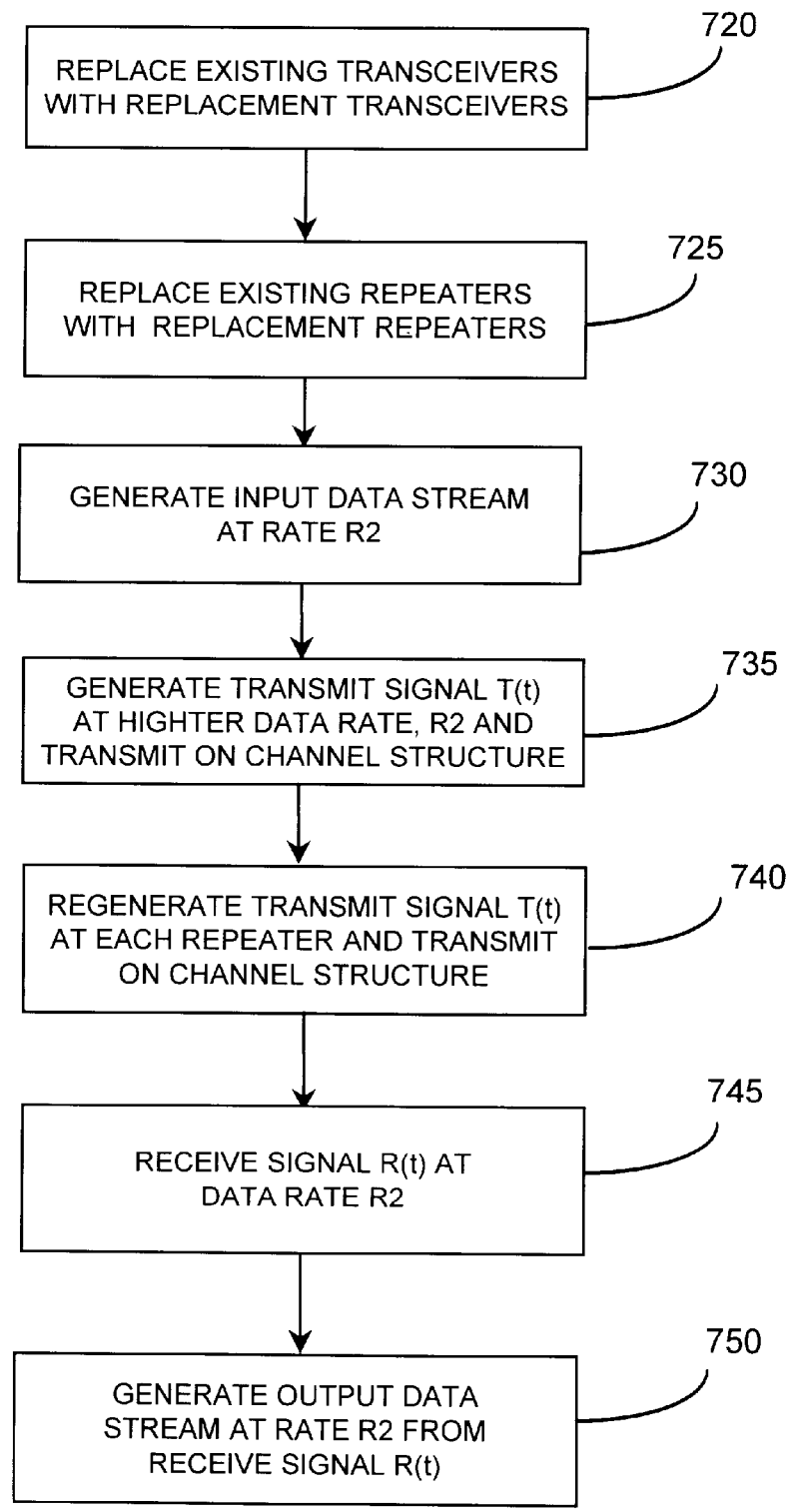
FIG. 7 is a flow chart illustrating a method for providing an improved telecommunication system in accordance with the present invention.

FIG. 2 illustrates an existing repeatered T1-carrier system that has been modified in accordance with the present invention. An input data stream 212 ($D_{in}(n)$) having a data rate ("second data rate") that is substantially higher than the DS1 data rate ("first data rate") is supplied to the transmitter section 210 of a replacement transceiver 260 which is designed to operate at the higher rate, e.g., DS2 or at any other data rate that is at least twice as great as DS1. In accordance with one aspect of the invention, transceivers 260 have replaced transceivers 160 (FIG. 1) on a one-for-one basis (FIG. 7). In accordance with another aspect of the invention, transceivers 260 are installed in existing transceiver equipment racks, in unpopulated card slots reserved for conventional T1-carrier transceivers.

Referring to FIG. 2, the transmitter 210 of the transceiver 260 generates an output signal T(t) from the downstream input data stream $D_{in}(n)$. The output signal T(t) is transmitted to the receiver section 220 of transceiver 260 connected to the far end of the channel structure via the existing channel structure and repeaters 230$_j$ (for j=1 to N) where N is the total number of repeaters on the channel structure between transceivers 260 at each end of the channel structure. In accordance with one aspect of the invention, repeaters 230$_j$ comprise repeaters that have replaced conventional existing repeaters 130, 132, 134 (FIG. 1) on a one-for-one basis. In accordance with another aspect of the invention, repeaters 230$_j$ comprise repeaters installed in existing repeater racks, in unpopulated card slots reserved for conventional T1-carrier repeaters.

Each of the repeaters 230$_j$ has a corresponding input signal $R_j(t)$ for j=1 to N, and an output signal $T_j(t)$ for N as defined. Each of the repeaters 230$_j$ incorporates a receiver section 220 (FIG. 5) for receiving signal $R_j(t)$ and a transmitter section 210 (FIG. 5) for regenerating a transmit signal $T_j(t)$.

As illustrated in FIG. 2, the upstream leg is configured in the same way as the downstream leg, with intermediate upstream and downstream repeaters 230$_j$ being mounted on the same plug-in board 250.

Figure 3:
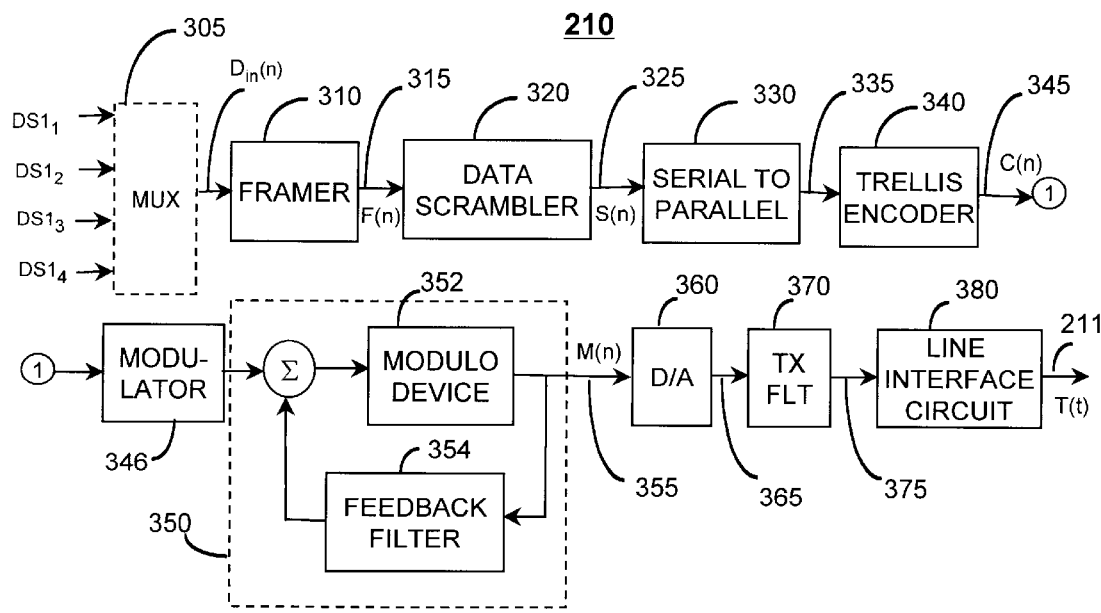
FIG. 3 is a block diagram illustrative of the transmitter portion of a transceiver in accordance with the present invention.

FIG. 3 illustrates a block diagram of the transmitter section 210 of the transceiver 260. An input data stream $D_{in}(n)$ at DS2 rate is applied to a framer 310 of the transmitter 210. The output of the framer 310 is a framed signal 315 (F(n)), which contains the input data $D_{in}(n)$ and additional data, such as sync words, payload blocks, CRC bits, stuff bits, and embedded operation channel bits, as well as other information required for the system's operation and maintenance.

A scrambler 320 randomizes the framed serial data F(n). The scrambled serial data stream S(n) from the scrambler 320 is converted to a parallel format data stream by serial-to-parallel converter 330. A trellis encoder 340 encodes the output 335 of converter 330 into an encoded signal C(n). The encoded output 345 of encoder 340 is modulated or mapped to signal points by a code translator or modulator 346, in accordance with a suitable modulation format, e.g., pulse amplitude modulation (PAM), quadrature amplitude modulation (QAM), or carrierless amplitude and phase modulation (CAP).

The mapped signal output of modulator 346 is then applied to a channel precoder 350, to precondition the output of the modulator 346 in order to cancel the impairments to be caused by transmission via the established channel structure to the second location. The channel precoder 350 incorporates a modulo device 352 and a feedback filter 354 to provide for impairment cancellation. Details of a suitable channel precoder are disclosed in U.S. Pat. No. 5,809,033 ("the '033 patent"), assigned to the assignee of this application; the disclosure of the '033 patent is hereby incorporated by reference.

The output of the channel precoder 350 is a precoded signal M(n), which is then converted to an analog signal 365 by digital-to-analog ("D/A") converter 360. Analog signal 365 is filtered by a transmitter filter 370. For PAM modulation, the filter 370 has preselected pulse shaping characteristics to assure that signal 375 is spectrally compatible with conventional T1-carrier transmit signals. Line interface circuit 380 processes signal 375 to obtain transmit signal T(t), which is supplied to an assigned twisted-wire pair in the cable segment or end section 140 of the channel structure. The transmit signal T(t) is transferred via the repeatered channel structure to the receiver section 220 of the transceiver 260 connected to the far end of the channel structure.

Figure 4:
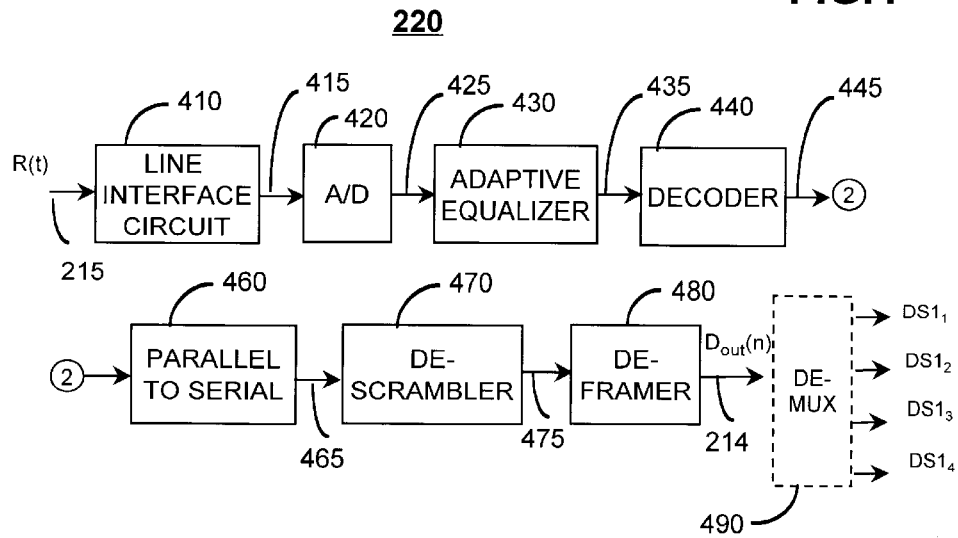
FIG. 4 is a block diagram illustrative of the receiver portion of a transceiver in accordance with the present invention.

FIG. 4 illustrates a block diagram of the receiver 220 of the transceiver 260. The receive signal R(t) acquired by receiver 220 is converted to a digital signal 425 by line interface circuit 410 and analog-to-digital ("A/D") converter 420. An adaptive equalizer 430 removes some of the distortion generated by the channel structure and applies the equalized signal 435 to a decoder 440. The output 445 of the decoder 440 is converted to a serial data stream 465 by a parallel-to-serial converter 460. The serial data stream 465 is then descrambled by a descrambler 470. A deframer 480 removes framing bits from the descrambled signal 475 and produces an output data stream $D_{out}(n)$. The output data stream $D_{out}(n)$ is a time delayed version of the input data stream $D_{in}(n)$, assuming no transmission errors occur. The expected bit error rate of the apparatus of FIGS. 2, 4, 5 is 1.0E-7 as determined by simulation of the transceivers 260, repeaters $230_j$, and established T1-carrier channel structure.

A DS2 rate input data stream $D_{in}(n)$ can be obtained in a number of ways, e.g., directly, or by multiplexing a plurality of lower rate data streams, e.g., four DS1 data streams. Referring to FIGS. 3, 4, a multiplexer 305 can be provided at the input of transmitter 210 to combine four DS1 data streams (DS1, through DS14) to obtain the desired DS2 rate signal $D_{in}(n)$. A demultiplexer 490 is then connected at the output of receiver 220 to separate the regenerated DS2 rate signal $D_{out}(n)$ into the original components DS1, through DS14.

Figure 5:
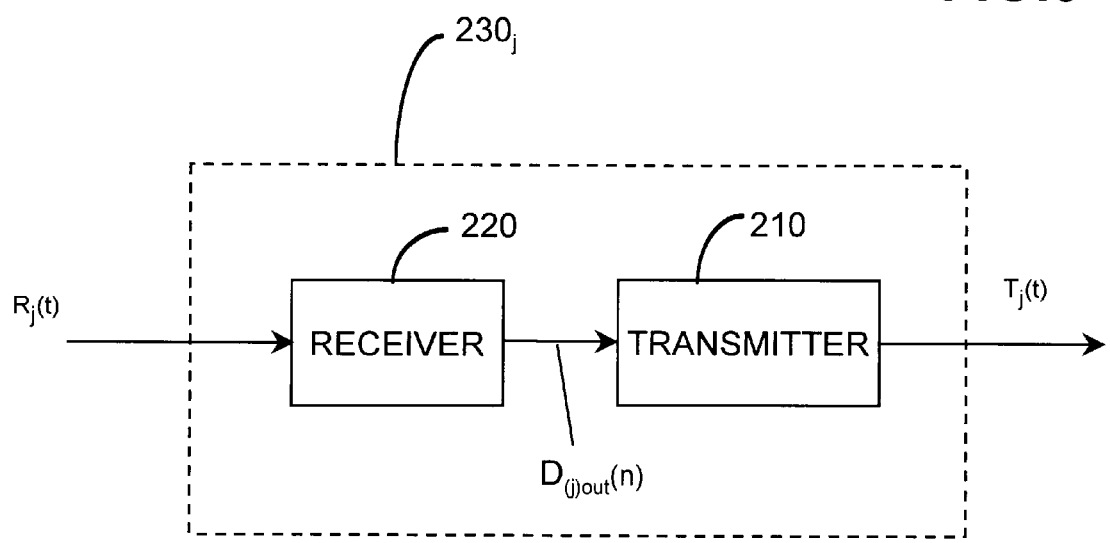
FIG. 5 is a block diagram illustrative of a repeater in accordance with the present invention.

FIG. 5 illustrates a block diagram of the repeater $230_j$. The repeater $230_j$ combines the elements of transmitter 210 (FIG. 3) and receiver 220 (FIG. 4) to regenerate the desired transmit signal $T_j(t)$ from the impaired receive signal $R_j(t)$. In operation, the output data stream $D_{(j)out}(n)$ regenerated from the impaired receive signal $R_j(t)$ at the repeater $230_j$ is a time delayed version of the data stream $D_{(j-1)out}(n)$ regenerated from the receive signal $R_{j-1}(t)$ at the preceding repeater $230_{j-1}$ (FIG. 5), assuming no transmission errors occur.

The benefits of the installing transceivers 260 and repeaters $230_j$ of the illustrative embodiment of the invention in an existing T1-carrier system, either as direct replacements for existing conventional T1-carrier transceivers and repeaters or in existing unpopulated card slots reserved for future installation of conventional T1-carrier transceivers and repeaters, include performance on existing T1-carrier channel structure similar to or better than the performance at DS1 rate of conventional repeatered T1-carrier at data rates of two to four, and more, times faster DS1 rate.

In addition, the illustrative embodiment of the invention applied to existing repeatered T1-carrier uses relatively simple modulation methods, which have low latency and complexity. Because low complexity translates to low cost and low power requirements, the transceivers and repeaters of the embodiments of the invention can be used as one-for-one replacements of the existing conventional T1-carrier transceivers and repeaters or in substitution for conventional T1-carrier equipment intended to be installed in the future.

Figure 6:
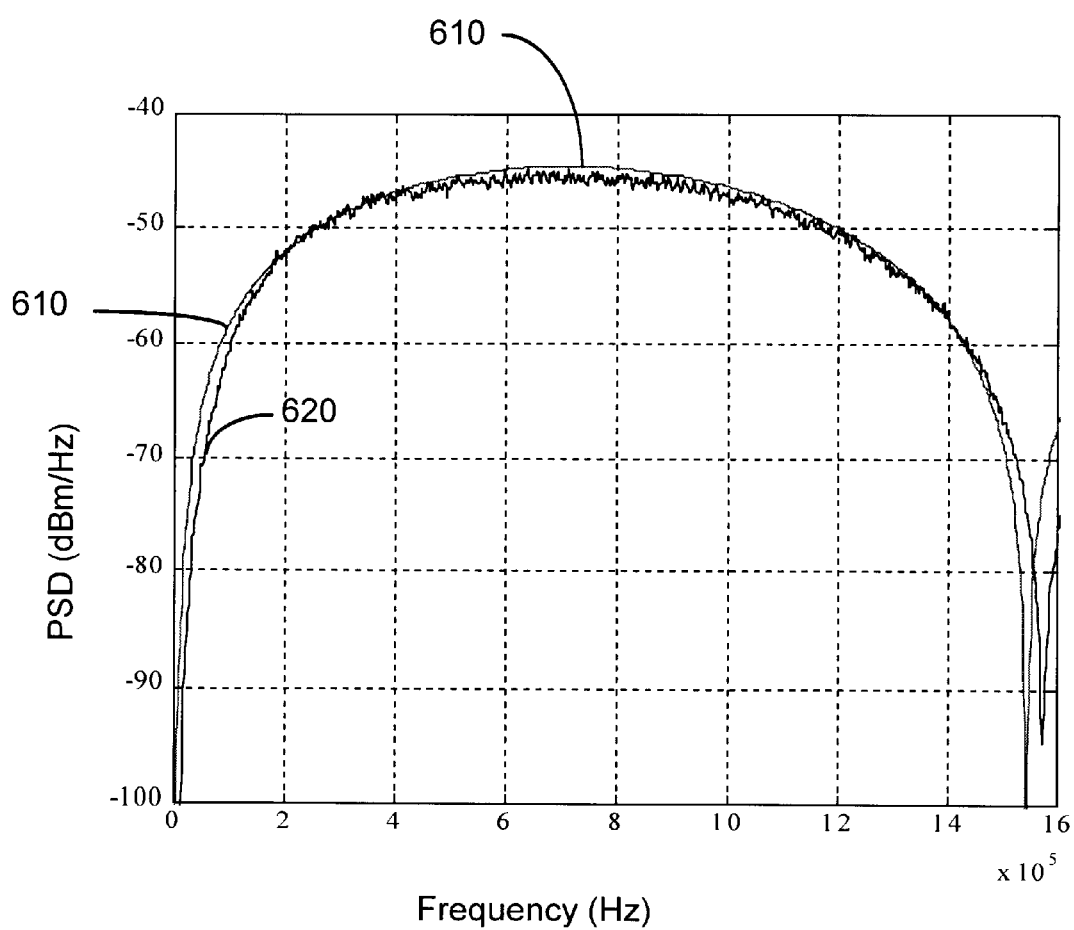
FIG. 6 is a graphical representation showing a comparison of the power spectral densities of a conventional repeated T1-carrier system (FIG. 1) and a system modified in accordance with an illustrative embodiment (FIGS. 2–5) of the present invention.

Furthermore, in order to meet the requirements of service providers, the transceiver and repeater components of the present invention are constructed and arranged so as not to cause harm to existing services. To assure spectral compatibility with existing unmodified repeatered T1-carrier lines and other existing services, the frequency content of the transmit signal generated in accordance with the present invention is predetermined to provide a power spectral density (PSD) that is equal to or less than the PSD of the conventional repeatered T1-carrier system. FIG. 6 illustrates the PSD 610 of a conventional repeatered T1-carrier system and the PSD 620 of an embodiment of the present invention using PAM modulation.

Although the illustrative embodiment of FIGS. 2–6 uses PAM, those skilled in the art will be able by use of other modulation techniques, e.g., QAM and CAP, to obtain BER performance approaching that of PAM modulation. However, considering all factors including complexity, latency, power requirements, and cost, transceivers and repeaters embodying PAM modulation are preferred and achieve all of the stated objectives of the present invention.

As noted above, a typical conventional repeatered T1-carrier system can include DS1 rate transceiver equipment racks and DS2 repeater equipment racks containing unpopulated transceiver and repeater card slots, and channel structure cable sections containing unassigned twisted-wire pairs. In accordance with and illustrative of one aspect of the present invention, a method for increasing the rate of digital transmission over the existing repeatered channel structure of such established T1-carrier telecommunication system, wherein said channel structure comprises cables of twisted-wire pairs designed and constructed to transfer data at a first data rate, wherein transceivers and repeaters designed and constructed to transfer data at the first data rate are intended to be installed in equipment racks incorporating unpopulated card slots provided therefore, and wherein each unpopulated card slot is preassigned a preselected set of twisted wire pairs in the cable sections, comprises the steps of installing transceivers, which are operational at a second data rate substantially greater than the first data rate and are spectrally compatible with transceivers operational at the first data rate, in the unpopulated transceiver slots; and installing repeaters, which are operational at the second data rate and are spectrally compatible with repeaters operational at the first data rate, in the unpopulated repeater slots associated with the installed transceivers.

The steps of another method in accordance with and illustrative of the present invention are depicted as method 700 in FIG. 7. In addition to or as an alternative of the method described in the immediately preceding paragraph, the method 700 can be used to substantially increase the data transfer rates of existing digital transmission systems, e.g., simplex repeatered T1-carrier systems, by replacing existing T1 carrier transceivers and repeaters operational at a first data rate with transceivers and repeaters operational at a second data rate substantially greater than the first data rate.

Referring to FIG. 7, the method 700 includes the step of replacing the existing transceivers and repeaters of a repeatered T1-carrier system on a one-for-one basis by replacement transceivers and replacement repeaters (720, 725). The method further includes the steps of generating an input data stream at a high rate R2 (730), generating a transmit signal T(t) from the input data stream at rate R2 (735), and transmitting signal T(t) via the existing channel structure (735) to the far end transceiver. The method additionally includes the steps of regenerating the transmit signal T(t) at each replacement repeater from a channel impaired receive signal R(t) and retransmitting the regenerated signal T(t) via the channel structure (740). The method lastly includes the steps of acquiring and processing the receive signal R(t) at the far end transceiver (745) thereby generating an output data stream at rate R2 representing a time delayed version of the input data stream (750).

FIG. 8 depicts the steps of an illustrative method 800 of the present invention for generating a transmit signal T(t). A high rate R2 input data stream is obtained in a suitable way, e.g., by combining a plurality of low rate data streams in a multiplexer to form the R2 rate data stream (815). The method next includes adding framing bits to the R2-rate data stream to form a framed signal (820) and processing the framed signal to form a scrambled signal (825). The method further includes the steps of encoding the scrambled signal in a trellis coding operation (830) and mapping the encoded signal into signal points to form a modulated signal (835). The method next includes processing the modulated signal to generate a channel precoded signal (840) and filtering and amplifying the channel precoded signal to derive transmit signal T(t) (845). After transmitting T(t) via the channel structure, receive signal R(t) acquired at the far end is decoded, demodulated, and descrambled to recover a time delayed version of the R2 rate input data stream (FIG. 9).

FIG. 9 depicts the steps of an illustrative method 900 of the present invention for processing an acquired receive signal R(t) to obtain a time delayed version of the original R2 rate input data stream. The method 900 includes the steps of acquiring a receive signal R(t) from the last one of the replacement repeaters (915) and converting the acquired signal to a digital signal (920). The method further includes the steps of equalizing the digital signal (925), decoding the equalized signal (930), descrambling the decoded signal (935), and deframing the descrambled signal to derive the R2 rate output data stream (940).

If the R2 rate input data stream was obtained by multiplexing a plurality of low rate data streams, the R2 rate output data stream obtained from step 940 is demultiplexed to obtain time delayed versions of the plurality of low rate data streams (945).

FIG. 10 depicts the steps of an illustrative method 1000 for regenerating a transmit signal T(t) at each repeater location in the repeatered channel structure to which the present invention is applied. The method 1000 combines in serial order the steps of methods 900 and 800. Thus, method 1000 includes the steps of acquiring and processing a receive signal $R_j(t)$ to regenerate an R2 rate data stream and processing of the R2 rate data stream to regenerate an R2 rate transmit signal $T_j(t)$.

Thus, the method 1000 includes the steps of acquiring (1015) and then digitizing a receive signal R(t) (1020), equalizing the digitized signal (1025), decoding the equalized signal (1030), descrambling the decoded signal (1032), deframing the descrambled signal (1035) thereby to regenerate an R2 rate data stream from which a repeater transmit signal $T_j(t)$ is to be obtained.

The method 1000 additionally includes the steps of adding framing bits to the regenerated R2 rate data stream (1040), processing the framed signal to derive a scrambled signal (1045), encoding the scrambled signal by a trellis coding operation (1050), mapping the encoded signal into signal points to derive a modulated signal (1055), processing the modulate signal to generate a channel precoded signal (1060) and filtering and amplifying the channel precoded signal thereby to regenerate the transmit signal $T_j(t)$ (1062).

In the embodiment of the present invention illustrated in FIGS. 2–10, data are transferred in the downstream direction on the existing channel structure of a repeatered T1-carrier system. The existing channel structure comprises pluralities of twisted-wire pairs arranged in cable bundles or sections 140, 144, 146. Data are transferred in the upstream direction on the existing channel structure comprising a like plurality of twisted-wire pairs arranged in like cable bundles or sections 140, 144, 146. The data transfer arrangement using two sets of associated or preassigned twisted-wire pairs in existing cable sections providing for both upstream and downstream data transfers is accomplished using simplex data transfer in both the downstream and upstream directions.

In another illustrative embodiment of the present invention (FIGS. 11A, 11B) two sets of associated twisted-wire pairs in existing cable sections are used for data transfer in both upstream and also downstream directions, thereby providing full-duplex data transfer on the T1-carrier system channel structure. The data rate supported by one set of associated twisted-wire pairs can be, for example, two times the DS1 rate in both the upstream and downstream directions. Hence, the embodiment of FIGS. 11A and 11B requires assignment of two sets of twisted-wire pairs in order to provide a full-duplex transfer at the DS2 rate.

In order to provide full-duplex data transfer, the transceivers and repeaters (FIGS. 2–5) are coupled for echo cancellation. The details of coupling for echo cancellation are also described in detail in U.S. Pat. No. 5,809,033, incorporated hereinabove by reference. When in accordance with the present invention, the existing T1-carrier channel structure is used to provide DS2 rate full-duplex data transfer, the resulting full-duplex system transfers data at four times the DS1 data rate of the conventional repeatered T1-carrier simplex system.

Figure 11A:
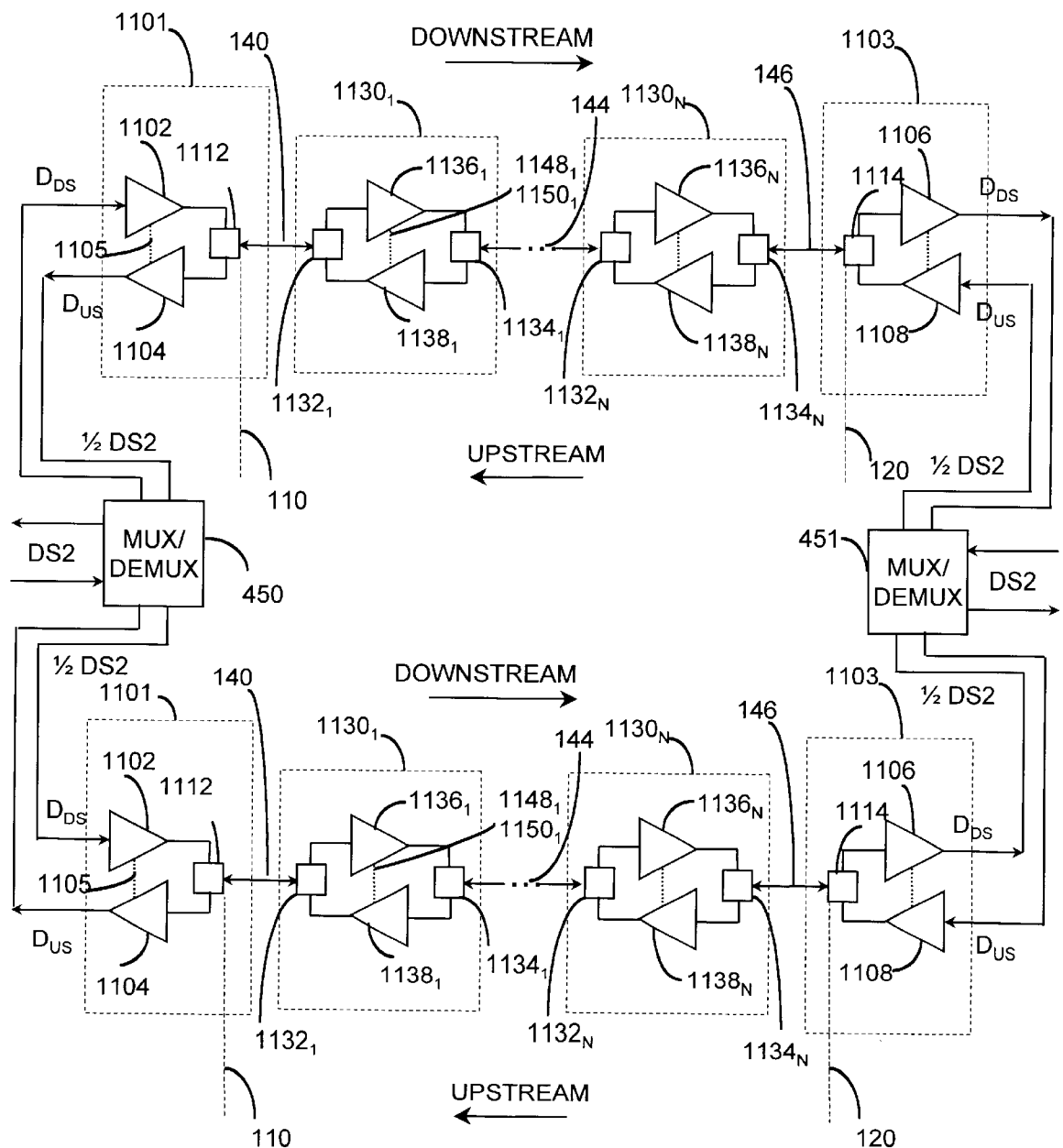
FIGS. 11A and 11B are block diagrams of the T1-carrier system of FIG. 1 modified in accordance with another illustrative embodiment of the present invention to incorporate full duplex data transfer on the existing T1-carrier channel structure.
Figure 11B:
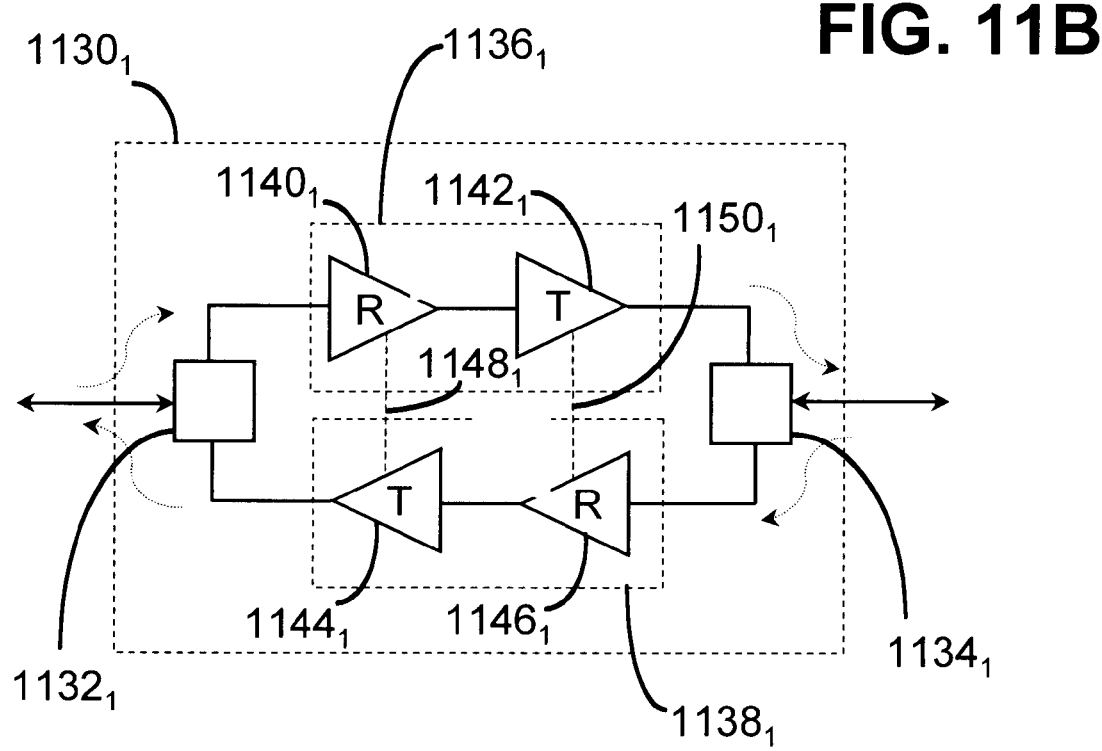

FIGS. 11A and 11B illustrate the structure of a full-duplex data transfer system in accordance with the present invention. Two identical links, each having downstream and upstream legs, are interconnected by multiplexer/demultiplexer units 450, 451. Each link comprises a transceiver 1101 mounted on a plug-in board at a first location 110 incorporates a transmitter 1102 and a receiver 1104 coupled via 1105 for echo cancellation. The output of the transmitter 1101 is coupled to a transmit terminal of a hybrid circuit 1112, the input to the receiver 1104 is coupled to a receiver terminal of the hybrid 1112, and the first end section 140 of the channel structure is coupled to a line terminal of the hybrid 1112.

The remote end of first end section 140 of each link is connected to the first repeater $1130_1$ which incorporates a downstream hybrid $1132_1$ and an upstream hybrid $1134_1$. The hybrids $1132_1$ and $1134_1$ provide a one pair to two pair conversion on each end of the repeater $1130_1$. The repeater $1130_1$ incorporates a downstream transceiver $1136_1$ and an upstream transceiver $1138_1$. The downstream transceiver $1136_1$ and the upstream transceiver $1138_1$ are coupled via $1148_1$ and $1150_1$ for echo cancellation, described in more detail with reference to FIG. 11B. Referring to FIG. 11B, the echo cancellation couplings $1150_1$ and $1148_1$ within each repeater are from a downstream transmitter $1142_1$ to an upstream receiver $1146_1$ and from an upstream transmitter $1144_1$ to a downstream receiver $1140_1$, respectively.

Additional repeaters $1130_j$ (for j=1 to N) as required on the channel structure, are identical to the first repeater $1130_1$. The last repeater $1130_N$ in each link is connected via channel structure end section 146 to the transceiver 1103 at the second location 120.

The transceivers 1101, 1103 are structurally identical and are interconnected by units 450, 451 at respective ends of the cable structure 140, 144, 146. The input at location 110 comprises a DS2 rate signal coupled to the transceivers 1101 via a conventional multiplexer/demultiplexer 450, labeled MUX/DEMUX in the drawing. The two outputs $D_{DS}$ of unit 450 comprise downstream data transmitted at a rate of one-half DS2. The output of receivers 1104 at location 110 comprises time delayed upstream data, $D_{US}$, at one-half DS2 rate. The two $D_{US}$ outputs of receivers 1104 are connected to unit 450 whose output in response thereto is a time-delayed DS2 rate upstream signal. Similarly, the output of the receivers 1106 at location 120 comprises time delayed DS2 rate downstream data $D_{DS}$ and the input to the transmitters 1108 at location 120 comprises one-half DS2 rate upstream data $D_{US}$ from MUX/DEMUX unit 451, which is identical to unit 450.

In the full-duplex embodiment of FIGS. 11A, 11B, the repeaters 1130$_f$ regenerate transmit signals T(t) as described with reference to the embodiment of FIGS. 2–5. In a conventional repeatered system T1-carrier system modified in accordance with the illustrative embodiment of FIGS. 11A, 11B, full-duplex data transfer is achieved on each existing assigned twisted-wire pair set in the cable bundles 140, 144, 146. Therefore, for example, full-duplex data transfer on two twisted wire pairs at an R2 rate equal to one-half the DS2 data rate results in the DS2 data transfer achieved by the simplex system of FIG. 2. The modulation methods implemented in the transceiver and repeater elements of FIGS. 11A, 11B are the same as the modulation methods described above with reference to FIGS. 2–5.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims:

What is claimed is:

1. A method for increasing the rate of digital transmission over the repeatered channel structure of an existing telecommunication system having at least one transceiver connected at each end of the structure and at least one repeater incorporated into the structure, wherein said structure comprises a plurality of cable sections, each of said cable sections binding a plurality of twisted-wire pairs, said at least one repeater coupled to at least one of said twisted-wire pairs bound within one of said cable sections, wherein said system was constructed and arranged to transmit data at a first data transfer rate between said existing transceivers and through at least said one cable section, the method comprising the steps of:

equipping said system with at least one transceiver at each end of said structure, each such pair of transceivers being interconnected via said structure and being operational at a second data transfer rate, substantially higher than said first data transfer rate;

communicating at said second data transfer rate between said each such pair of transceivers and through at least said one cable section;

ensuring that said each such pair of transceivers is spectrally compatible with said existing transceivers;

equipping said system with one or more repeaters operational at said second data transfer rate and being coupled to one or more of said twisted-wire pairs bound within said one cable section; and ensuring that said one or more repeaters is spectrally compatible with said existing repeaters, each of said one or more repeaters being incorporated via said structure between a respective pair of said compatible transceivers.

2. The method of claim 1, wherein said cable sections were constructed and arranged for T1 communication.

3. The method of claim 1, further comprising the step of communicating between said existing transceivers and through said one cable section at said first data transfer rate prior to said equipping steps.

4. A method for increasing the rate of digital transmission over the repeatered channel structure of an existing telecommunication system having at least one transceiver connected at each end of the structure and at least one repeater incorporated into the structure, wherein said structure comprises a plurality of cable sections, each of said cable sections binding a plurality of twisted-wire pairs, said at least one repeater coupled to at least one of said twisted-wire pairs bound within one of said cable sections, wherein said system was constructed and arranged to transmit data at a first data transfer rate between said existing transceivers and through at least said one cable section, the method comprising the steps of:

equipping said system with a plurality of transceivers at each end of said structure, each pair of such transceivers being interconnected via said structure and being operational at a second data transfer rate, substantially higher than said first data transfer rate;

communicating at said second data transfer rate between said each pair of such transceivers and through at least said one cable section;

ensuring that said each pair of such transceivers is spectrally compatible with said existing transceivers;

equipping said system with a second plurality of repeaters operational at said second data transfer rate and being coupled to one or more of said twisted-wire pairs bound within said one cable section; and ensuring that each of said second plurality repeaters is spectrally compatible with said existing repeaters, each of said second plurality of repeaters being interconnected via said structure between respective pairs of said compatible transceivers.

5. A method for increasing the rate of digital transmission over the existing repeatered channel structure of an established telecommunication system having at least one existing transceiver connected at each end of said structure and at least one existing repeater incorporated into said structure, wherein said structure comprises a plurality of cable sections, each of said cable sections binding a plurality of twisted-wire pairs, each existing repeater coupled to a respective one of said twisted-wire pairs bound within one of said cable sections, wherein each existing transceiver, each existing repeater, and said channel structure were constructed and arranged to transfer data at a first data rate through at least said one cable section, said method comprising the steps of:

replacing each existing transceiver operational at said first rate on a one-for-one basis with a replacement transceiver, each replacement transceiver being operational at a second data rate substantially greater than said first rate;

communicating, via each replacement transceiver, at said second data rate through at least said one cable section;

ensuring that each replacement transceiver is spectrally compatible with said existing transceivers;

replacing each existing repeater operational at said first rate on a one-for-one basis with a replacement repeater, each replacement repeater being operational at said second rate and being coupled to one or more of said twisted-wire pairs bound within said one cable section; and ensuring that each replacement repeater is spectrally compatible with said existing repeaters.

6. The method of claim 5, wherein said cable sections were constructed and arranged for T1 communication.

7. The method of claim 5, further comprising the step of communicating with each existing transceiver and through said one cable section at said first data rate prior to said replacing steps.

8. A method for increasing the rate of digital transmission over the existing repeatered channel structure of an established telecommunication system having a plurality of existing transceivers connected at each end of said structure and a plurality of existing repeaters incorporated into said structure, wherein said structure comprises a plurality of cable sections, each of said cable sections binding a plurality of twisted-wire pairs, said existing repeaters coupled to twisted-wire pairs bound within one of said cable sections, wherein said transceivers, said repeaters, and said channel structure were constructed and arranged to transfer data at a first data rate between said existing transceivers and through at least said one cable section, comprising the steps of:

replacing said existing transceivers operational at said first rate on a one-for-one basis with a like plurality of replacement transceivers, each replacement transceiver being operational at a second data rate substantially greater than said first rate;

communicating at said second data rate between said replacement transceivers and through at least said one cable section;

ensuring that each replacement transceiver is spectrally compatible with said existing transceivers;

replacing said existing repeaters operational at said first rate on a one-for-one basis with a like plurality of replacement repeaters, each replacement repeater being operational at said second rate and being coupled to one or more of said twisted-wire pairs bound within said one cable section; and ensuring that each replacement repeater is spectrally compatible with said existing repeaters.

9. A method for increasing the rate of digital transmission over the existing repeatered channel structure of an established T1-carrier telecommunication system having at least one existing transceiver connected at each end of said structure and at least one existing repeater incorporated into said structure, wherein said structure comprises a plurality of cable sections, each of said cable sections binding a plurality of twisted-wire pairs, said at least one existing repeater coupled to at least one of said twisted-wire pairs bound within one of said cable sections, wherein each existing transceiver, each existing repeater, and said channel structure were constructed and arranged to transfer data at a first data rate between said existing transceivers and through at least said one cable section, comprising the steps of:

replacing each existing transceiver operational at said first rate on a one-for-one basis with a replacement transceiver, each replacement transceiver being operational at a second data rate substantially greater than said first rate;

communicating, iva each replacement transceiver, at said second data rate through at least said one cable section;

ensuring that each replacement transceiver is spectrally compatible with each replaced existing transceiver;

replacing each existing repeater operational at said first rate on a one-for-one basis with a replacement repeater, each replacement repeater being operational at said second rate and being coupled to one or more of said twisted-wire pairs bound within said one cable section; and ensuring that each replacement repeater is spectrally compatible with each replaced existing repeater.

10. The method of claim 9, further comprising the step of communicating with each existing transceiver and through said one cable section at said first data rate prior to said replacing steps.

11. A method for increasing the rate of digital transmission over the existing repeatered channel structure of an established T1-carrier telecommunication system having a plurality of existing transceivers connected at each end of said structure and a plurality of existing repeaters incorporated into said structure, wherein said structure comprises a plurality of cable sections, each of said cable sections binding a plurality of twisted-wire pairs, said at least one existing repeater coupled to at least one of said twisted-wire pairs bound within one of said cable sections, wherein said transceivers, said repeaters, and said channel structure were constructed and arranged to transfer data at a first data rate between said existing transceivers and through at least said one cable section, comprising the steps of:

replacing said existing transceivers operational at said first rate on a one-for-one basis with a like plurality of replacement transceivers, each replacement transceiver being operational at a second data rate substantially greater than said first rate;

communicating at said second data rate between said replacement transceivers and through at least said one cable section;

ensuring that each replacement transceiver is spectrally compatible with said replaced existing transceivers;

replacing said existing repeaters operational at said first rate on a one-for-one basis with a like plurality of replacement repeaters, each replacement repeater being operational at said second rate and being coupled to one or more of said twisted-wire pairs bound within said one cable section; and ensuring that each replacement repeater is spectrally compatible with said replaced existing repeaters.

12. A method for increasing the rate of digital transmission over the existing repeatered channel structure of an established T1-carrier telecommunication system having at least one existing transceiver connected at each end of said structure and at least one existing repeater incorporated into said structure, wherein said structure comprises a plurality of cable sections, each of said cable sections binding a plurality of twisted-wire pairs, said at least one existing repeater coupled to at least one of said twisted-wire pairs bound within one of said cable sections, wherein each existing transceiver, each existing repeater, and said channel structure were constructed and arranged to transfer data at a first data rate between said existing transceivers and through at least said one cable section, comprising the steps of:

replacing each existing transceiver operational at said first rate on a one-for-one basis with a replacement transceiver, each replacement transceiver being operational at a second data rate substantially greater than said first rate;

communicating, iva each replacement transceiver, at said second data rate through at least said one cable section;

ensuring that each replacement transceiver is spectrally compatible with each replaced existing transceiver;

replacing each existing repeater operational at said first rate on a one-for-one basis with a replacement repeater, each replacement repeater being operational at said second rate and being coupled to one or more of said twisted-wire pairs bound within said one cable section;

ensuring that each replacement repeater is spectrally compatible with each replaced existing repeater;

applying an input data stream at said second data rate to the transmitter of each replacement transceiver connected at one end of said channel structure;

generating a transmit signal from said applied input data stream;

transferring said transmit signal from said transmitter via said replacement repeatered channel structure to the receiver of a predetermined replacement transceiver connected at the other end of said channel structure; and processing said transferred signal acquired by said receiver to generate a time delayed version of said input data stream.

13. A method for increasing the rate of digital transmission over the existing repeatered channel structure of an established T1-carrier telecommunication system having at least one existing transceiver connected at each end of said structure and at least one existing repeater incorporated into said structure, wherein each existing transceiver, each existing repeater, and said channel structure were constructed and arranged to transfer data at a first data rate, comprising the steps of:

replacing each existing transceiver operational at said first rate on a one-for-one basis with a replacement transceiver, each replacement transceiver being operational at a second data rate substantially greater than said first rate and being spectrally compatible with each replace existing transceiver;

replacing each existing repeater operational at said first rate on a one-for-one basis with a replacement repeater, each replacement repeater being operational at said second rate and being spectrally compatible with each replaced existing repeater;

applying an input data stream at said second data rate to the transmitter of each replacement transceiver connected at one end of said channel structure;

generating a transmit signal from said applied input data stream;

transferring said transmit signal from said transmitter via said replacement repeatered channel structure to the receiver of a predetermined replacement transceiver connected at the other end of said channel structure; and processing said transferred signal acquired by said receiver to generate a time delayed version of said input data stream, wherein:

A. the step of generating a transmit signal comprises the steps of:

adding bits to the applied input data stream to form a framed signal;

randomizing the framed signal to form a scrambled signal;

converting the scrambled signal to a digital signal;

performing a trellis encoding operation on the digital signal to form an encoded signal;

modulating the encoded signal by mapping said encoded signal into signal points to form a modulated signal;

subjecting the modulated signal to channel preceding to form a precoded signal; and subjecting the precoded signal to filtering and amplifying to form a transmit signal;

B. the step of transferring the transmit signal via said replacement repeatered channel structure comprises the steps of:

acquiring a receive signal at a preselected replacement repeater;

converting the acquired receive signal to a digital signal;

equalizing the digital signal using an adaptive equalizer;

decoding the equalized digital signal;

descrambling the decoded signal;

deframing the descrambled signal to regenerate a data stream at said second rate representative of said input data stream;

adding bits to the regenerated data stream to form a framed signal;

randomizing the framed signal to form a scrambled signal:

converting the scrambled signal to a digital signal;

performing a trellis encoding operation on the digital signal to form an encoded signal;

modulating the encoded signal by mapping said encoded signal into signal points to form a modulated signal;

subjecting the modulated signal to channel preceding to form a precoded signal; and subjecting the precoded signal to filtering and amplifying to form a regenerated transmit signal; and C. further wherein the step of processing the transferred signal acquired by the receiver comprises the steps of:

acquiring a receive signal from said channel structure;

converting the acquired receive signal to a digital signal;

equalizing the digital signal using an adaptive equalizer;

decoding the equalized digital signal;

descrambling the decoded signal; and deframing the descrambled signal to form said time delayed version of said input data stream.

14. The method according to claim 13, wherein said replacement transceivers and said replacement repeaters are configured for full duplex data transfer.

15. The method according to claim 14 wherein the second rate is at least twice the first rate.

16. The method according to claim 14 wherein the first rate is DS1 and the second rate is DS2 and further wherein the step of generating said transmit signal comprises a modulating step selected from the group consisting of the step of pulse amplitude modulating said input data stream, the step of quadrature amplitude modulating said data stream, and the step of carrierless amplitude and phase modulating said input data stream.

17. The method of claim 15, wherein the step of applying an input data stream at the second rate additionally comprises the step of multiplexing a plurality of data streams to form said input data stream at said second rate and wherein the step of processing said transferred signal additionally comprises the step of demultiplexing said time delayed version of said input data stream to reform said plurality of data streams.

18. The method of claim 16, wherein the step of applying an input data stream at the second rate additionally comprises the step of multiplexing a plurality of data streams to form said input data stream at said second rate and wherein the step of processing said transferred signal additionally comprises the step of demultiplexing said time delayed version of said input data stream to reform said plurality of data streams.

19. A method for increasing the rate of digital transmission over the existing repeatered channel structure of an established T1-carrier telecommunication system having a plurality of existing transceivers connected at each end of said structure and a plurality of existing repeaters incorporated into said structure, wherein said structure comprises a plurality of cable sections, each of said cable sections binding a plurality of twisted-wire pairs, said at least one existing repeater coupled to at least one of said twisted-wire pairs bound within one of said cable sections, wherein said transceivers, said repeaters, and said channel structure were constructed and arranged to transfer data at a first data rate between said existing transceivers and through at least said one cable section, comprising the steps of:

replacing said existing transceivers operational at said first rate on a one-for-one basis with a like plurality of replacement transceivers, each replacement transceiver being operational at a second data rate substantially greater than said first rate;

communicating at said second data rate between said replacement transceivers and through at least said one cable section;

ensuring that each replacement transceiver is spectrally compatible with said replaced existing transceivers;

replacing said existing repeaters operational at said first rate on a one-for-one basis with a like plurality of replacement repeaters, each replacement repeater being operational at said second rate and being coupled to one or more of said twisted-wire pairs bound within said one cable section;

ensuring that each replacement repeater is spectrally compatible with said replaced existing repeaters;

applying an input data stream at said second data rate to the transmitter of at least one replacement transceiver connected at one end of said channel structure;

generating a transmit signal from said applied input data stream;

transferring said transmit signal from said transmitter via said replacement repeatered channel structure to the receiver of a predetermined replacement transceiver connected at the other end of said channel structure; and processing said transferred signal acquired by said receiver to generate a time delayed version of said input data stream.

20. A method for increasing the rate of digital transmission over the existing repeatered channel structure of an established T1-carrier telecommunication system having a plurality of existing transceivers connected at each end of said structure and a plurality of existing repeaters incorporated into said channel structure, wherein said transceivers, said repeaters, and said channel structure were constructed and arranged to transfer data at a first data rate, comprising the steps of:

replacing said existing transceivers operational at said first rate on a one-for-one basis with a like plurality of replacement transceivers, each replacement transceiver being operational at a second data rate substantially greater than said first rate and being spectrally compatible with said replaced existing transceivers;

replacing said existing repeaters operational at said first rate on a one-for-one basis with a like plurality of replacement repeaters, each replacement repeater being operational at said second rate and being spectrally compatible with said replaced existing repeaters;

applying an input data stream at said second data rate to the transmitter of at least one replacement transceiver connected at one end of said channel structure;

generating a transmit signal form said applied input data stream;

transferring said transmit signal from said transmitter via said replacement repeatered channel structure to the receiver of a predetermined replacement transceiver connected at the other end of said channel structure; and processing said transferred signal acquired by said receiver to generate a time delayed version of said input data stream, wherein:

A. the step of generating a transmit signal comprises the steps of:

adding bits to the applied input data stream to form a framed signal;

randomizing the framed signal to form a scrambled signal;

converting the scrambled signal to a digital signal;

converting the scrambled signal to a digital signal;

performing a trellis encoding operation on the digital signal to form an encoded signal;

modulating the encoded signal by mapping said encoded signal into signal points to form a modulated signal;

subjecting the modulated signal to channel precoding to form a precoded signal; and subjecting the precoded signal to filtering and amplifying to form a transmit signal;

B. the step of transferring the transmit signal via said replacement repeatered channel structure comprises the steps of:

acquiring a receive signal at a preselected replacement repeater;

converting the acquired receive signal to a digital signal;

equalizing the digital signal using an adaptive equalizer;

decoding the equalized digital signal;

descrambling the decoded signal;

deframing the descrambled signal to regenerate a data stream at said second rate representative of said input data stream;

adding bits to the regenerated data stream to form a framed signal;

randomizing the framed signal to form a scrambled signal;

converting the scrambled signal to a digital signal;

performing a trellis encoding operation on the digital signal to form an encoded signal;

modulating the encoded signal by mapping said encoded signal into signal points to form a modulated signal;

subjecting the modulated signal to channel precoding to form a precoded signal; and subjecting the precoded signal filtering and amplifying to form a regenerated transmit signal; and C. further wherein the step of processing the transferred signal acquired by the receiver comprises the steps of:

acquiring a receive signal from said channel structure;

converting the acquired receive signal to a digital signal;

equalizing the digital signal using an adaptive equalizer;

decoding the equalized digital signal;

descrambling the decoded signal; and deframing the descrambled signal to form said time delayed version of said input data stream.

21. An information transmission system comprising:
an existing T1 carrier channel structure operational at DS1 rate and constructed and arranged to incorporate at least one repeater;
at least one repeater operational at DS2 rate incorporated in said channel structure;
at least one transceiver operational at DS2 rate connected at one end of said channel structure;
at least one transceiver operational at DS2 rate connected at the other end of said channel structure, wherein the receiver and transmitter of said last mentioned transceiver are assigned and connected via said existing channel structure and said DS2 rate repeater incorporated therein, to the transmitter and receiver respectively of said first mentioned transceiver; and
a DS2 rate input data stream source connected to the respective inputs of each of said transmitters;
the combination being so constructed and arranged that:
(i.) each transmitter generates a modulated DS2 transmit signal from said DS2 rate input data stream and transfers said transmit signal to the transmitter's assigned receiver via said existing channel structure and said DS2 rate repeater incorporated therein;
(ii.) each receiver processes a receive signal acquired from said existing channel structure and generates therefrom a time delayed version of said input data stream, wherein:
A. said transmitter of each of said transceivers comprises:
a framer for adding bits to said DS2 rate input data stream to form a framed signal;
a data scrambler for the framed signal to form a randomized signal;
a converter for the randomized signal to form a digital signal;
a trellis encoder for the digital signal to form an encoded signal;
a modulator for mapping the encoded signal into signal points to form a modulated signal;
a channel precoder for the modulated signal to form a precoded signal; and
a line interface circuit for the precoded signal to form said DS2 transmit signal therefrom;
B. said receiver of each of said transceivers comprises:
an input section for acquiring a receive signal from said existing channel structure;
a converter for the receive signal to form a digital signal;
an adaptive equalizer for the digital signal to form an equalized digital signal;
a decoder for the equalized digital signal to form a decoded signal;
a descrambler for the decoded signal to form a descrambled signal; and deframer for the descrambled signal to form a time delayed version of said DS2input data stream; and further wherein
C. each of said repeaters comprises:
an input section for acquiring a receive signal from said existing channel structure;
a converter for the acquired receive signal to form a digital signal;
an adaptive equalizer for the digital signal to form an equalized digital signal;
a decoder for the equalized digital signal to form a decoded signal;
a descrambler for the decoded signal to form a descrambled signal;
a deframer for the descrambled signal to regenerate a DS2 data stream;
a framer for adding framing bits to the regenerated DS2 data stream to form a framed signal;
a data scrambler for the framed signal to form a randomized signal;
a converter for the randomized signal to form a digital signal;
a trellis encoder for the digital signal to form an encoded signal;
a modulator for mapping the encoded signal into signal points to form a modulated signal;
a channel precoder for the modulated signal to form a precoded signal; and
a line interface circuit for the precoded signal to regenerate a DS2 transmit signal.

22. The information transmission system of claim 21 wherein said modulators operate in accordance with a process selected form the group consisting of the process of pulse amplitude modulation, the process of quadrature amplitude modulation, and the process of carrierless amplitude and phase modulation.

23. The information transmission system of claim 21, wherein, said DS2 rate transceivers and said DS2 rate repeaters.

24. The information transmission system of claim 22, wherein said DS2 rate transceivers and said DS2 rate repeaters are configured for full duplex data transfer.

25. The information transmission system of claim 24, wherein each DS2 rate input data stream source comprises a multiplexer for combining a plurality of DS1 rate data streams to form said DS2 rate input data stream to be transferred to an assigned receiver; and further wherein said system additionally comprises a demultiplexer to which the time delayed version of said DS2 input data stream generated by said assigned receiver is supplied to reform said plurality of DS1 rate data streams.

26. A method for increasing the rate of digital transmission over the existing repeatered channel structure of an established T1-carrier telecommunication system, which incorporates transceivers and repeaters installed in equipment racks incorporating card slots provided therefore, said racks containing unpopulated card slots reserved for future installation of said transceivers and repeaters, said transceivers and repeaters being constructed and arranged to transfer data at a first data rate, and further wherein said channel structure comprises cable sections of twisted-wire pairs constructed and arranged to transfer data at said first data rate, and wherein each of said card slots is preassigned to a preselected set of twisted-wire pairs in said cable sections, said method comprising the steps of:
equipping at least one transceiver card slot at each end of said structure with a transceiver operational at a second data rate substantially greater than said first data rate, said transceivers being spectrally compatible with transceivers operational at said first data rate and being interconnectable via one of said preassigned preselected sets of twisted-wire pairs;
equipping one or more repeater slots, which are interconnectable between said second data rate transceivers via said one of said preassigned preselected sets of twisted-wire pairs, with repeaters being operational at said second data rate and being spectrally compatible with repeaters operational at said first data rate;
applying an input data stream at said second data rate to the transmitter of each second data rate transceiver connected at one end of said channel structure;

generating a transmit signal from said applied input data stream;

transferring said transmit signal from said transmitter via said one of said preassigned preselected sets of twisted-wire pairs of said repeatered channel structure to the receiver of a predetermined second data rate transceiver connected at the other end of said preassigned preselected set of said channel structure; and processing said transferred signal acquired by said receiver to generate a time delayed version of said input data stream, wherein:

A. the step of generating a transmit signal comprises the steps of:
   adding bits to the applied input data stream to form a framed signal;
   randomizing the framed signal to form a scrambled signal;
   converting the scrambled signal to a digital signal;
   performing a trellis encoding operation on the digital signal to form an encoded signal;
   modulating the encoded signal by mapping said encoded signal into signal points to form a modulated signal;
   subjecting the modulated signal to channel precoding to form a precoded signal; and
   subjecting the precoded signal to filtering and amplifying to form a transmit signal;

B. the step of transferring the transmit signal via said repeatered channel structure comprises the steps of:
   acquiring a receive signal at a preselected one of said second data rate repeaters;
   converting the acquired receive signal to a digital signal;
   equalizing the digital signal using an adaptive equalizer;
   decoding the equalized digital signal;
   descrambling the decoded signal;
   deframing the descrambled signal to regenerate a data stream at said second rate representative of said input data stream;
   adding bits to the regenerated data stream to form a framed signal;
   randomizing the framed signal to form a scrambled signal;
   converting the scrambled signal to a digital signal;
   performing a trellis encoding operation on the digital signal to form an encoded signal;
   modulating the encoded signal by mapping said encoded signal into signal points to form a modulated signal;
   subjecting the precoded signal to filtering and amplifying to form a regenerated transmit signal; and C. further wherein the step of processing the transferred signal acquired by said receiver comprises the steps of:
   acquiring a receive signal from said channel structure;
   converting the acquired receive signal to a digital signal;
   equalizing the digital signal using an adaptive equalizer;
   decoding the equalized digital signal;
   descrambling the decoded signal; and
   deframing the descrambled signal to form said time delayed version of said input data stream.

27. The method according to claims 26, wherein said second data rate transceivers and said second data rate repeaters are configured for full duplex data transfer.

28. The method according to claim 27 wherein the second rate is at least twice the first rate.

29. The method according to claim 27 wherein the first rate is DS1 and the second rate is DS2 and further wherein the step of generating said transmit signal comprises a modulating step selected from the group consisting of the step of pulse amplitude modulating said input data stream, the step of quadrature amplitude modulating said data stream, and the step of carrierless amplitude and phase modulating said input data stream.

30. The method of claim 27, wherein the step of applying an input data stream at the second rate additionally comprises the step of multiplexing a plurality of data streams to form said input data stream at said second rate and wherein the step of processing said transferred signal additionally comprises the step of demultiplexing said time delayed version of said input data stream to reform said plurality of data streams.

* * * * *